(12) United States Patent
Westphal et al.

(10) Patent No.: US 8,439,307 B2
(45) Date of Patent: May 14, 2013

(54) STRUCTURAL COMPONENT WITH RIB AND CROSS MEMBER ELEMENT

(75) Inventors: Philipp Westphal, Fuhlendorf (DE); Wolf-Dietrich Dolzinski, Ganderkesee (DE); Thorsten Roming, Himmelpforten (DE); Thorsten Schroeer, Buxtehude (DE); Dieter Kohlgrueber, Stuttgart (DE); Marius Luetzenburger, Boeblingen (DE)

(73) Assignees: Airbus Operations GmbH, Hamburg (DE); DLR-Deutsches Zentrum fuer Luft- und Raumfahrt e.V., Cologne (DE)

( * ) Notice: Subject to any disclaimer, the term of this patent is extended or adjusted under 35 U.S.C. 154(b) by 120 days.

(21) Appl. No.: 12/638,423

(22) Filed: Dec. 15, 2009

(65) Prior Publication Data
US 2013/0009008 A1 Jan. 10, 2013

Related U.S. Application Data

(63) Continuation of application No. PCT/EP2008/057992, filed on Jun. 24, 2008.

(60) Provisional application No. 60/937,888, filed on Jun. 29, 2007.

(30) Foreign Application Priority Data

Jun. 29, 2007 (DE) .......................... 10 2007 030 026

(51) Int. Cl.
*B64C 1/18* (2006.01)

(52) U.S. Cl.
USPC ............................................ 244/121; 244/119

(58) Field of Classification Search ................... 244/119, 244/121; *B64C 1/18*
See application file for complete search history.

(56) References Cited

U.S. PATENT DOCUMENTS 2,242,199 A 5/1941 Woods
2,412,778 A 12/1946 Kosek
(Continued)

FOREIGN PATENT DOCUMENTS

FR 2877916 5/2006
GB 590511 A 7/1947
(Continued)

OTHER PUBLICATIONS

Hurley, Todd and Jill Vandenburg. "Small Airplane Crashworthiness Design Guide." Apr. 12, 2002.*

(Continued)

*Primary Examiner* — Tien Dinh
*Assistant Examiner* — Michael Kreiner
(74) *Attorney, Agent, or Firm* — Jenkins, Wilson, Taylor & Hunt, P.A.

(57) ABSTRACT

The present invention provides a fuselage structure for an aircraft or spacecraft with an outer skin. The fuselage structure comprises a rib element for stiffening the outer skin and ad cross member element. Here the rib element is bent in the shape of an arc to correspond to an inner contour of the outer skin. The cross member element connects two arc sections of the rib element transversely to each other. The cross member element has a higher strength than the rib element. From another point of view the invention provides an aircraft with such a fuselage structure.

22 Claims, 5 Drawing Sheets

U.S. PATENT DOCUMENTS

| | | | |
|---|---|---|---|
| 4,593,870 A * | 6/1986 | Cronkhite et al. | 244/117 R |
| 4,601,367 A * | 7/1986 | Bongers | 188/377 |
| 5,069,318 A * | 12/1991 | Kulesha et al. | 188/377 |
| 7,025,305 B2 * | 4/2006 | Folkesson et al. | 244/117 R |
| 7,874,516 B2 | 1/2011 | Cacciaguerra | |
| 7,913,950 B2 | 3/2011 | Huber | |
| 2007/0007392 A1 | 1/2007 | Huber et al. | |
| 2007/0176048 A1 | 8/2007 | Huber et al. | |
| 2008/0093503 A1 | 4/2008 | Cacciaguerra | |
| 2009/0206202 A1 * | 8/2009 | Bolukbasi et al. | 244/121 |
| 2012/0126057 A1 | 5/2012 | Huber et al. | |

FOREIGN PATENT DOCUMENTS

| | | |
|---|---|---|
| WO | WO 2005012084 | 2/2005 |
| WO | WO 2006/051235 A | 5/2006 |
| WO | WO 2007/033640 A | 3/2007 |
| WO | WO 2009/003870 A2 | 1/2009 |
| WO | WO 2009/003870 A4 | 1/2009 |

OTHER PUBLICATIONS

Wiggenraad, J.F.M., et al. "Development of a crashworthy composite fuselage structure for a commuter aircraft." Report issued Dec. 8, 1999.*

Fasanella, Edwin, et al. "Impact Testing and Simulation of a Crashworthy Composite Fuselage Section with Energy-Absorbing Seats and Dummies." Jun. 2002. NASA TM-2002-211731.*

Wiggenraad, J.F.M., et al. "Development of a crashworthy composite fuselage concept for a commuter aircraft." Issues Mar. 9, 2001.*

Fasanella, Edwin, et al. "Impact Testing and Simulation of a Crashworty Composite Fuselage Section with Energy-Absorbing Seats and Dummies." Paper presented Jun. 13, 2002.*

Jackson, Karen, et al. "Impact Testing and Simulation of a Crashworthy Composite Fuselage." Paper presented May 4, 2000.*

Davis, G.W., et al. "Design Considerations for Composite Fuselage Structure of Commercial Transport Aircraft." Mar. 1981.*

International Search Report with Written Opinion from PCT/EP2008/057992 dated Dec. 19, 2008.

Russian Notice of Grant dated at least as early as Jun. 2012 for Appl. No. 2009144359/11.

German Office Action for Serial No. 102007030026.5 dated Dec. 8, 2011.

* cited by examiner

STRUCTURAL COMPONENT WITH RIB AND CROSS MEMBER ELEMENT

CROSS-REFERENCE TO RELATED APPLICATIONS

This application is a continuation of PCT International Application No. PCT/EP2008/057992 filed Jun. 24, 2008, which claims the benefit of U.S. Provisional Application No. 60/937,888, filed Jun. 29, 2007 and German Patent Application No. 10 2007 030 026.5, filed Jun. 29, 2007, the entire disclosures of which are herein incorporated by reference.

FIELD OF THE INVENTION

The present invention relates to a structural component for an aircraft or spacecraft, and in particular to a structural component which has a rib element and a cross member element. The invention also relates to an aircraft with such a structural component.

Although applicable to any lightweight structures with a stiffened outer skin, the present invention and the problem on which it is based are explained in further detail with regard to the lower side of an aircraft fuselage.

Fuselage shells for aircraft are normally produced in so-called lightweight design from an outer skin which is reinforced on the inside by a two-dimensional structure of stringers running in the longitudinal direction of the aircraft and by ribs, acting as stiffening elements, running transversely to the longitudinal direction of the aircraft. Inside the aircraft fuselage components and structures that relate to the use of the aircraft are fastened to the ribs, e.g. hold or passenger compartment floors.

FIG. 1 shows, as an example, a section through the lower half of a conventional commercial aircraft fuselage with an essentially cylindrical shape. A rib 106 runs annularly along the inside of outer skin 100, which is shown only in certain sections for the sake of clarity. Rib 106 has, on its foot side bearing against outer skin 100, regular recesses 112 by means of which stringers 110 running in the longitudinal direction of the aircraft stinger 110 pass through the rib.

The aircraft fuselage is provided with a passenger compartment floor 108 approximately level with its greatest width. Passenger compartment floor 108 is on the one hand supported directly by rib 106 on its edges, and on the other hand is supported between its edges by perpendicularly running support rods 114, 114' against rib 106. In passenger floor 108 rails 116 run in the longitudinal direction of the aircraft, which rails support passenger seats, not shown here, when the aircraft is used for passenger transport.

A hold structure 118, which comprises, among other things, a horizontally running holds cross member 126, is fastened to rib 106 in the vicinity of fuselage underside 102. This hold cross member is fastened at its ends directly to rib 106, and is normally supported in the region between the ends by a central support 122 and lateral struts 124 against rib 106. A central profile 120 runs in the centre of hold cross member 126 in the longitudinal direction of the aircraft. Hold cross member 126, central profile 120 and laterally fitted support rails 105 support a hold floor 104, which is only partially represented for the sake of clarity.

For decades aluminium and aluminium alloys have been used as conventional materials for the hold and passenger compartment floor structures described, as well as for the outer skin, stringers and ribs. However, these materials are being replaced increasingly by composite fibre materials, in particular by carbon fibre reinforced plastic (CFP), since a lower total weight of the aircraft and hence a lower energy consumption in flight operation can be achieved thereby whilst retaining the same strength and stiffness. Further advantages of the composite fibre materials over aluminium materials are the low material fatigue and the avoidance of corrosion problems.

When aluminium materials are replaced by composite fibre materials, consideration must be given, however, to the fact that both material classes behave very differently when loaded beyond the load limit. Whilst aluminium materials are subjected to gradual plastic deformation under excessive loading, and absorb energy in doing so, there is a sudden fracture of the material, with a very low energy absorption, in the case of composite fibre materials, particularly CFP's. For this reason it must be assumed that the fuselage structure shown in FIG. 1 shows a very different behaviour under excessive loading, e.g. in the event of a crash from a low altitude, depending on whether the structure was produced from aluminium materials or composite fibre materials.

In the case of a structure according to FIG. 1, produced from aluminium, outer skin 100, stringers 110 and ribs 106, as well as hold structure 118, are deformed under the influence of the forces of impact acting on underside 102 of the aircraft fuselage. As a result of this a high proportion of the impact energy would be absorbed and the components in the upper region of the cabin would therefore be decelerated more uniformly. This limits the accelerations acting on the passengers on passenger floor 108 and increases their chances of survival.

On the other hand, in the case of a structure produced from a composite fibre material, according to FIG. 1, brittle fracture of outer skin 100, stringers 110 and rib 106 must be expected, only little energy being absorbed. Since the overlying hold structure 118 is only designed to deflect loading forces generated in flight operation into rib 106, early failure must be expected here too. Because of the lower energy absorption in the region of the hold structure, most of the impact energy is introduced into lateral shells 109 and support rods 114, 114', which rods can also break and may penetrate the passenger compartment endangering the lives and freedom from bodily harm of the passengers.

SUMMARY OF THE INVENTION

An object of this invention is therefore to improve the energy absorption behaviour of an aircraft fuselage structure in the event of an overload, particularly when the structure is produced essentially from composite fibre materials.

The idea on which this invention is based is to provide a fuselage structure for an aircraft or spacecraft that combines a rib element and a cross member element, the cross member element having a higher stiffness/strength than the rib element. The rib element serves exclusively to stiffen an outer skin of the aircraft or spacecraft, and is for this purpose bent in the shape of an arc corresponding to the inner contour of the outer skin. The cross member element connects two arc sections of the rib element transversely together and absorbs structurally mechanical loads to a greater extent than the latter.

Since the cross member element connects the arc sections of the rib element transversely together, it is more distant from the outer skin than the rib element. In the event of overloading of the envelope of the aircraft or spacecraft, the rib element therefore initially breaks and absorbs a lower proportion of impact energy. Since the cross member element has a higher stiffness/strength than the rib element, it does not break at the same time as the rib element, but in cascade fashion, staggered in time, under the influence of the energy reduced by the breakage of the rib element. The aircraft or spacecraft is braked in stages and hence more gently, which reduces the risk to passengers.

According to a preferred development at least one energy absorbing element is also provided, which connects a load introducing zone of the rib element to an opposing support section of the cross member element. This is particularly advantageous since at least one of the fragments remains supported by the energy absorbing element against the cross member element even after a fracture of the rib element in the event of an impact. In the further course of the impact the energy absorbing element is pushed further against the cross member that is still intact, energy continuing to be absorbed because of the specific design of the energy absorbing element. This ensures that the aircraft or spacecraft is braked uniformly.

According to preferred developments the energy absorbing element runs essentially in a direction perpendicular to the rib element and/or in a direction perpendicular to the cross member element. This provides an extremely stable support and hence high energy absorption with low use of material.

According to a preferred development the energy absorbing element has a trigger region at the end facing away from the rib element, which region is designed to fail earlier than other regions of the energy absorbing element when the energy absorbing element is overloaded. The energy absorbing element may, for example, be specifically weakened in the trigger region by holes or locally missing fibre layers. This generates an initial failure in the vicinity of the rib element followed by a stable failure or crash front which moves along the energy absorbing element towards the cross member.

According to a preferred development the absorbing element has a local mechanical strength which increases in the direction of the cross member element. Because of the design described the regions of the energy absorber lying close to the outer wall absorb energy first, whilst the regions lying further inside remain unharmed. This improves the connection of the energy absorbing element to the cross member element in the course of the progressive destruction of the energy absorbing element.

According to a preferred development the energy absorbing element is designed as a profile part. This gives it considerable buckling stability and allows high specific energy absorption with a comparatively low additional mass.

The energy absorbing element preferably has a closed, in particular circular or elliptical profile. Such a profile has an extremely high buckling stability and very high specific energy absorption properties.

Alternatively the energy absorbing element has a half-closed, in particular Ω-shaped, semicircular or semi-elliptical profile. Such a profile can be fastened with its open side to a surface, e.g. to a supporting strut provided between the rib element and the cross member element, with a saving of material and weight.

According to a preferred development the energy absorbing element is formed is integrally with the rib element and/or the cross member element. This has the advantage of lower manufacturing costs due to a small of components and lower weight due to the absence of connecting elements.

According to a preferred development the rib element is designed to stiffen the outer skin on a fuselage underside of the aircraft or spacecraft. This is advantageous because crashing at a low height generally results in an initial impact of the fuselage underside.

According to a preferred development the rib element has a Z- or L-profile. This is particularly advantageous because these profile forms allow simple assembly of an absorbing element on one side.

According to a preferred development the cross member element is designed to support a hold floor of the aircraft or spacecraft. The dual function of the cross member element allows savings in weight and costs.

According to a preferred development the cross member element runs between the two arc sections of the rib element essentially rectilinearly. This has the advantage of the highest possible stability with low material use.

According to a preferred development the cross member element has a J- or I-profile. This is particularly advantageous because these profiles have a high stiffness under bending load from the direction of the rib element. Moreover, the asymmetrical J-profile in particular also leaves room for the assembly of an absorber element on one side.

According to a preferred development the rib element is formed integrally with the cross member element. This results in lower production costs due to the reduced number of components. This is, in particular, also advantageous when the structural component is produced from aluminium.

According to a preferred development at least one coupling element is also provided for coupling at least one of the arc sections to a stiffening element of the aircraft or spacecraft. The coupling element has a mechanical strength which is lower than the mechanical strength of the stiffening element. This is advantageous because, in the case of an impact, the energy which was not absorbed by the rib element and the cross member element, is introduced by the coupling element into the remaining structure of the aircraft or spacecraft connected to the stiffening element. Since the mechanical strength of the coupling element is lower than that of the stiffening element, the coupling element first fails with the absorption of further energy, thereby reduces the decelerations acting on the passenger compartment, for example.

The mechanical strength of the coupling element is preferably lower than the mechanical strength of the cross member element. The advantage of this is that the stabilising function of the cross member element is maintained in the event of an impact. Furthermore, the mechanical strength of the coupling element is preferably higher than the mechanical strength of the absorbing element, which means that the coupling element does not begin to absorb energy until the available crash path of the energy absorbing element is applied. This gives rise to continuous, and hence more uniform braking of the fuselage structure.

The invention is explained in more detail in the following by means of exemplary embodiments with reference to the attached figures in the drawing.

DESCRIPTION OF EXEMPLARY EMBODIMENTS

In the figures the same reference symbols denote the same or functionally similar components, unless otherwise indicated.

Figure 2:
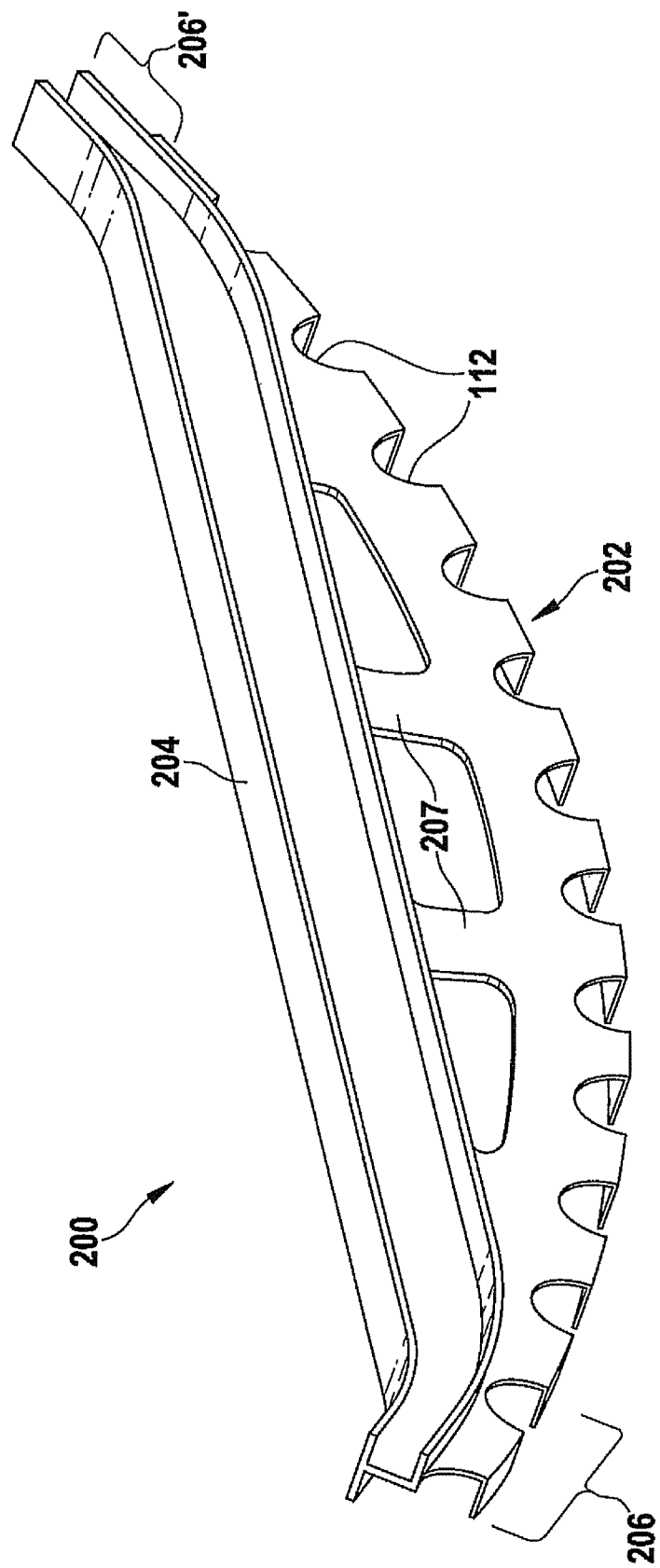
FIG. 2 shows a perspective view of a structural component according to a first embodiment.

FIG. 2 shows, in a perspective view, a structural component 200 for stiffening the outer skin of an aircraft fuselage on its underside. Structural component 200 is formed integrally from a carbon fibre reinforced plastic.

Structural component 200 comprises a rib element 202, which has an L-shaped profile and is bent in the shape of an arc corresponding to the inner curvature of the outer skin section to be stiffened on the underside of the aircraft fuselage. The rib foot formed by the L-shaped profile designed to bear against the outer skin is interrupted at regular intervals by recesses 112 through which, when structural component 200 is assembled in the aircraft fuselage, run stringers reinforcing through openings for the outer skin in the longitudinal direction of the aircraft.

Arc sections 206, 206' at both ends of rib element 202 are connected linearly in the nature of an arc chord by a cross member element 204. The cross member element has a "J"-shaped profile and is designed with a greater wall thickness than rib element 202. Because of the profile and wall thickness, the stiffness of cross member element 204 is much higher than that of rib element 202.

Rib element 202 is supported in its central region by two support struts 207 against cross member element 204. Supporting struts 207 run approximately perpendicularly to rib element 202, i.e. in an approximately radial direction of the arc of a circle described by rib element 202. Supporting struts 207 have a lower mechanical strength than cross member 204.

If rib element 202 breaks—e.g. due to impact or collision of the aircraft with its underside—the fragments of rib element 202 initially remain supported by supporting struts 207 against cross member element 204. Due to the lower strength of supporting struts 207, however, they are destroyed in the further development of the impact, according to the intensity of the impact, whilst the fragments of rib element 202 approach cross member 204. Supporting struts 207 are preferably designed as energy absorbing elements, e.g. as a hollow profile, so that during this destruction process they absorb the highest possible amount of energy, the energy absorption taking place, according to the design, through successive destruction or fragmentation. Alternatively, supporting struts 207 are designed to support energy absorbing elements, not shown here, which are produced separately, are mounted on supporting struts 207 and run parallel to them.

Figure 3A:
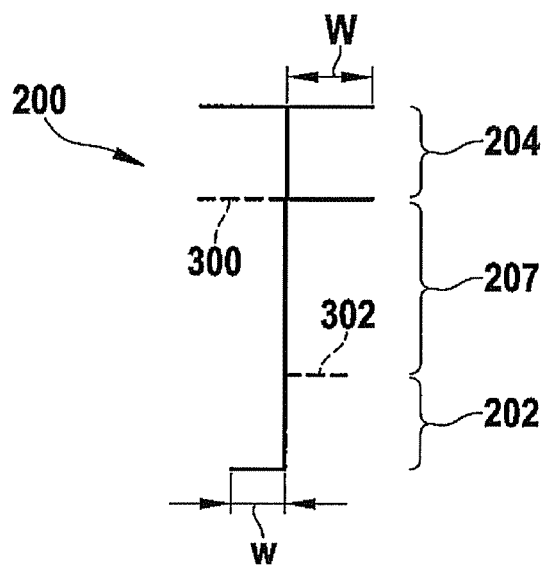
FIGS. 3A-C show diagrammatic profile cross-sections of structural components of different embodiments.

FIG. 3A shows, viewed only along the continuous lines, a cross-section of the profile of a structural component 200, e.g. the component shown in FIG. 2. The "L"-shape of the profile of rib element 202 and the "J"-shape of the profile of cross member element 204 are seen. Three horizontally running belt sections of the "J"-profile of cross member element 204 oppose the horizontally running section of the "L"-profile of rib element 202, in comparative terms, which requires greater stiffness of cross member element 204. The difference in stiffness is increased further in that the horizontal profile section (belt) of rib element 202 has a smaller width w than the corresponding width W of the belts of cross member element 204.

The profiles of cross member element 204 and rib element 202 can be varied in many ways. Some of the possibilities are shown in FIG. 3A by dotted lines. For example, the profile of cross member element 204, for example, may be designed in the shape of an "I" by accepting the additional horizontal profile section 300. At the same time, or alternatively, the profile of rib element 202 can be designed in the shape of a "Z" by accepting the additional horizontal profile section 302.

Supporting struts 207 have a simple flat profile, as a result of which their strength is lower than the respective strength of rib element 202 and cross member element 204.

Figure 3B:
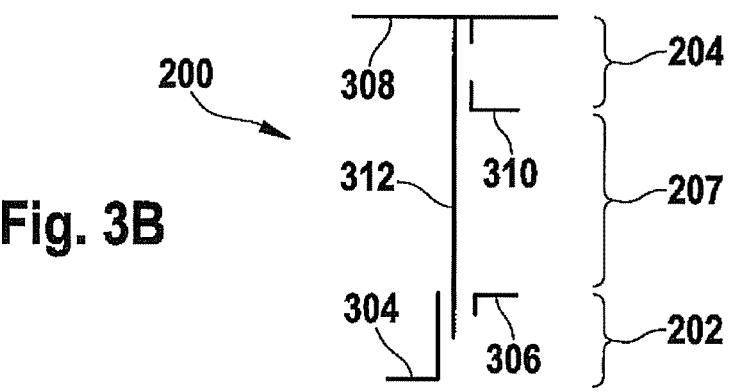
Figure 3C:
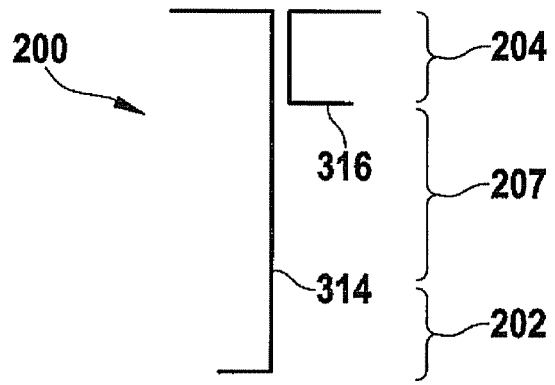

FIGS. 3B and 3C show as examples, in diagrammatic profile cross-sections, further embodiments of structural component 200. In this case structural component 200 is not produced integrally but is composed indifferent ways of individual components.

In the case of the profile shown in FIG. 3B rib element 202, for example, consists of a rib foot profile part 304 and a rib wing part 306. Cross member element 204 is composed of a cross member head section 308 and a cross member wing part 310. A central section 312 comprises sections of rib element 202 and cross member element 204, as well as supporting struts 207.

The profile shown in FIG. 3C is composed of two U-shape profiled halves 314, 316 whose walls overlap in the region of cross member element 204, which provides it with a greater stiffness.

Figure 4:
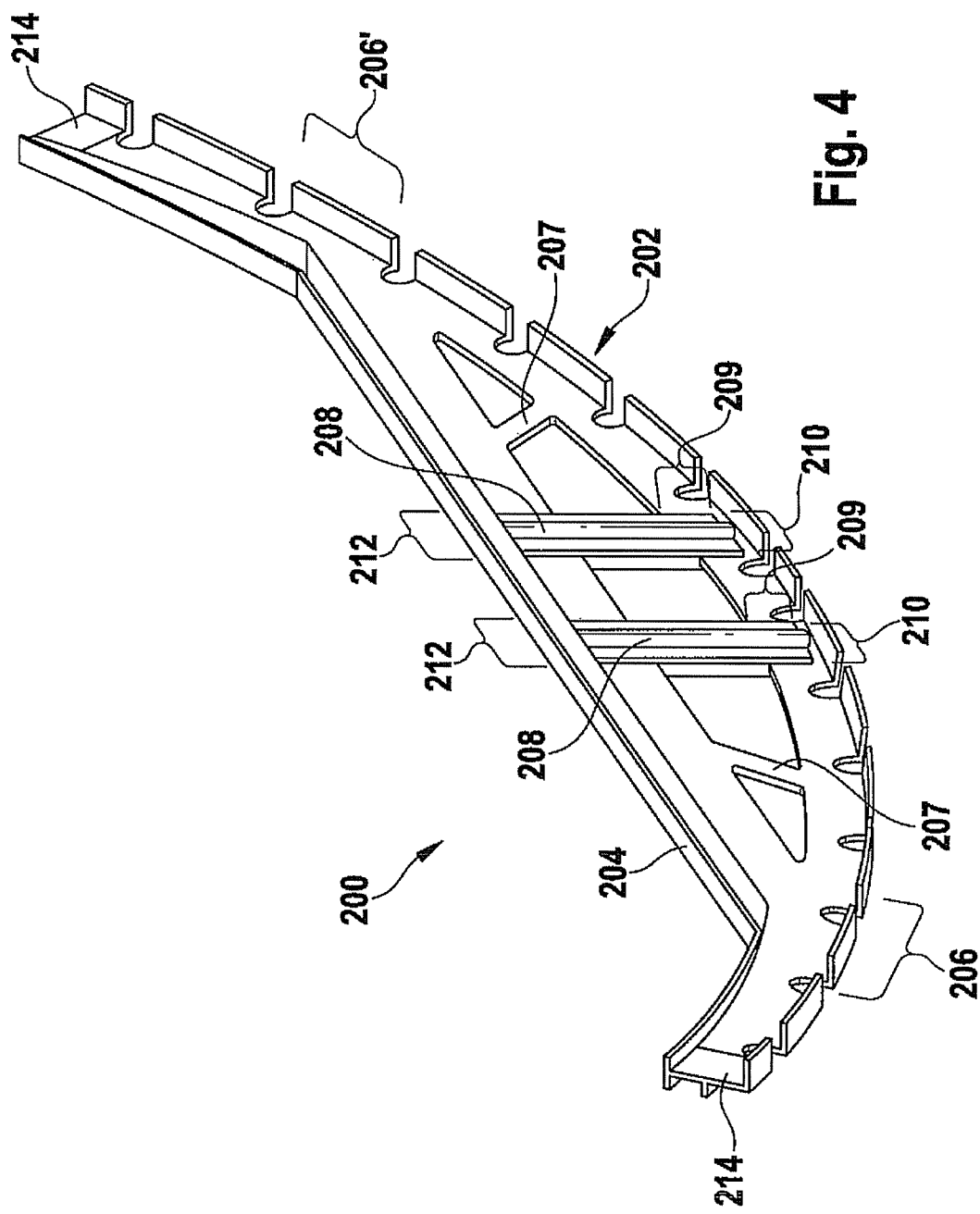
FIG. 4 shows a perspective view of a structural component according to a second embodiment.

FIG. 4 shows, in a perspective representation, a further embodiment of a structural component 200. As in the case of the embodiment shown in FIG. 2, structural component 200 comprises a rib element 202 and a cross member element 204 formed integrally with it, which last element connects two arc sections 206, 206' of the rib element rectilinearly to each other. The connected arc sections 206, 206', however, do not lie at the ends of rib element 202; instead rib element 202 continues beyond arc sections 206, 206' and terminates in coupling element 214 for coupling to further stiffening elements of the aircraft fuselage, e.g. regular ribs.

The profile of cross member element 204 is of a T-shaped design, the cross beam of the T-profile lying on the upper side. Rib element 202 has an L-profile in the region between arc sections 206, 206' on which it is connected to cross member element 204, whilst the profile passes into a Z-profile of a regular rib in the remaining regions lying outside the arc sections 206, 206'.

The T-profile of cross member element 204 and the L-profile of rib element 202 each offer on both sides a flat contact surface on which are placed energy absorbing elements 208 with a half-closed, Ω-shaped profile in a direction perpendicular to cross member element 204. Energy absorbing elements 208 are produced as separate components and are connected to rib element 202 and cross member element 204 by gluing, rivets and/or bolts. Energy absorbing elements 208 may, for example, be produced from CFP, metals or alternative composite structures such as sandwich structures. In this case the material for energy absorbing elements 208 may be selected independently of the material of rib element 202 and cross member element 204, so that the optimisation of the energy absorption properties is made possible. A trigger region 209 is formed at the end of each energy absorbing element 208 facing rib element 202, so that in the event of overloading of energy absorbing element 208, it fails earlier than other regions of energy absorbing element 208.

Furthermore, lateral supporting struts 207 are inserted between rib element 202 and cross member element 204, which struts are formed, in the example shown, integrally with rib element 202 and cross member element 204, and can also perform the function of an energy absorbing element 208 in the event of an impact when suitably designed as hollow profiles, for example.

Figure 1:
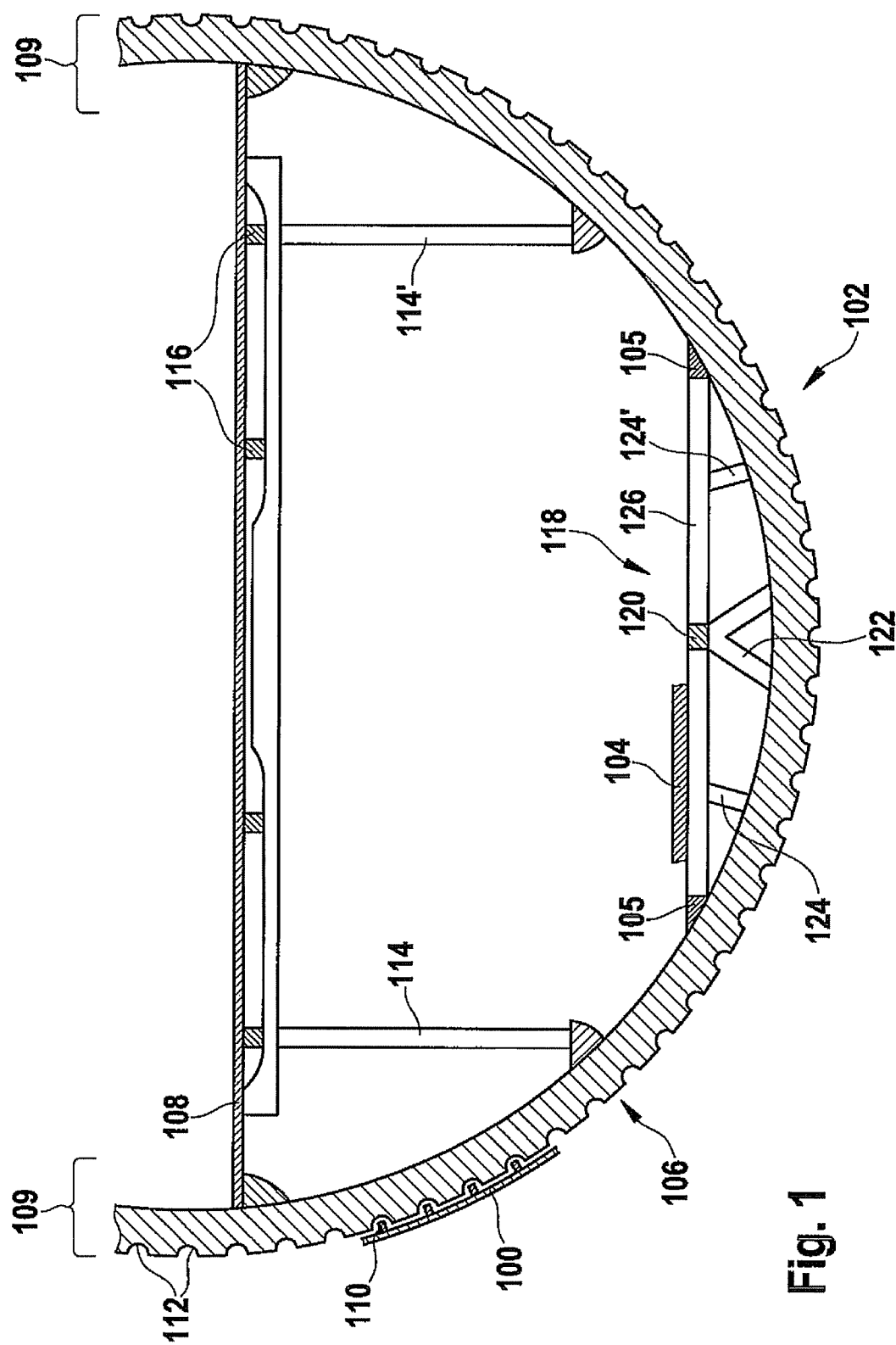
FIG. 1 shows a diagrammatic cross-sectional view of a lower half of a conventional aircraft fuselage.
Figure 5:
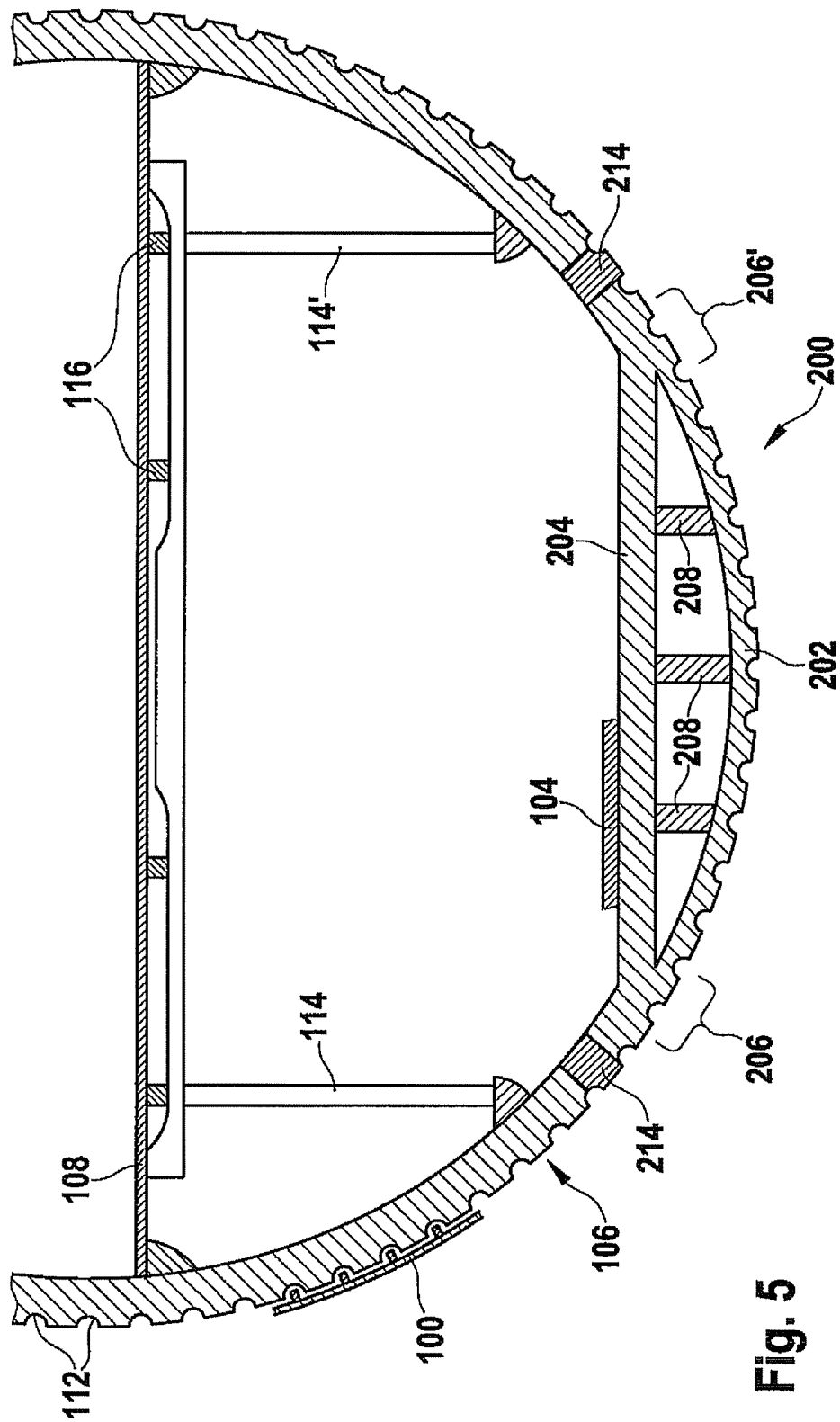
FIG. 5 shows a diagrammatic cross-sectional view of a lower half of the fuselage of an aircraft according to an embodiment of the invention.

FIG. 5 shows, in a similar diagrammatic cross-sectional view, as FIG. 1, the lower half of an aircraft fuselage with a structural component 200 according to one embodiment of the invention. As in FIG. 1, outer skin 100 with stringers 110, are only partially represented for the sake of clarity.

Structural component 200 comprises a rib element 202 bent to correspond to outer skin 100 on the fuselage underside, and a cross member element 204, which are formed integrally, e.g. as an integrated CFP or aluminium component, as well as three energy absorbing elements 208 running perpendicularly between both. Rib element 202 is in this case designed with lower mechanical strength between arc sections 206, 206' connected by cross member element 204 than in the regions lying outside arc sections 206, 206', where its profile corresponds to the profile of regular ribs 106, which are connected on both sides by coupling elements 214 to the structural component. Coupling elements 214 have a higher strength than energy absorbing elements 208, but are weaker than the regular ribs 106.

Cross member element 204 runs between arc sections 206, 206' of rib element 202, both rectilinearly and horizontally, and is constructed so that it is mechanically stronger than rib element 202 between arc sections 206, 206'. It supports a hold floor 104, which is only partially shown for the sake of clarity. All the other structures of the vehicle fuselage are shown unchanged relative to those in FIG. 1.

In the regular flight operation the structure shown supports the regular structural loads, cross member element 204, in particular, absorbing loads which are supported in conventional structures by regular ribs 106 because of its high stiffness.

In the event of an impact or crash onto the ground, e.g. in an emergency landing, the structure performs a cascaded absorption of energy in which rib element 202 is initially deformed/destroyed and is pressed against the stiff cross member element 204. Meanwhile energy absorbing elements 208 are gradually destroyed during the absorption of energy by deformation and/or fragmentation. If the action of energy absorbing elements 208 is exhausted, rib element 202 strikes against cross member 204. Because of the loads transmitted by cross member element 204 to the overlying structure, coupling elements 214 fail as the next weaker component after energy absorbing elements. Like energy absorbing elements 208 they are preferably designed to absorb a significant amount of energy during this process. Not until the action of coupling elements 214 has also been exhausted does the impact energy considerably reduced by the cascaded energy absorption described hit the overlying structure. Compared to conventional aircraft structures, the loads introduced by support rods 114, 114' and rib 106 in the lateral shell into passenger compartment is floor 108 and seat rails 116 are substantially reduced.

Although the present invention has been described here with reference to preferred exemplary embodiments, it is not limited to them but can be modified in many different ways.

For example, the energy absorbing elements may be supplied from closed profiles. Energy absorbing elements can be added both on one side and on both sides of the rib element and the cross member element.

LIST OF REFERENCE NUMERALS

100 Outer skin
102 Fuselage underside
104 Hold floor
105 Support rail
106 Stiffening element (rib)
108 Passenger compartment floor
109 Lateral shell
110 Stringer
112 Recesses
114, 114' Support rods
116 Passenger seat rails
118 Hold structure
120 Central profile
122 Central support
124, 124' Lateral supports
126 Hold cross member
200 Structural component
202 Rib element
204 Cross member element
206, 206' Arc sections
207 Supporting strut
208 Energy absorbing element
209 Trigger region
210 Load introducing zone
212 Support section
214 Coupling element
300, 302 Horizontal profile section
304 Rib foot profile part
306 Rib wing part
308 Cross member head section
310 Cross member wing part
312 Central profile part
314, 316 U-profile
W Width of a cross member profile section
w Width of a rib profile section

The invention claimed is:

1. A fuselage structure for an aircraft or spacecraft, comprising:
an outer skin having an arc-shaped inner curvature; and
a structural component, the structural component comprising:
a rib element formed in the shape of an arc corresponding to the inner curvature of the outer skin;
a cross member element, transversely connecting at least two arc sections of said arc-shaped rib element to each other, wherein the cross member element has a higher stiffness than the rib element;
an energy absorbing element, connecting a load introduction zone of the rib element to an opposing section of the cross member element,
wherein the energy absorbing element comprises at least one of a closed circular profile, a closed elliptical profile, a half-closed Ω-shaped profile, a semi-circular profile, or a semi-elliptical profile; and
a coupling element which couples at least one arc section of the rib element to a stiffening element, wherein the coupling element has a mechanical strength which is lower than a mechanical strength of the stiffening element.

2. The fuselage structure according to claim 1, wherein the energy absorbing element extends in a direction perpendicular to the rib element.

3. The fuselage structure according to claim 1, wherein the energy absorbing element extends in a direction perpendicular to the cross member element.

4. The fuselage structure according to claim 1, wherein the energy absorbing element comprises at an end facing away from the rib element, a trigger region, wherein the trigger region has a lower strength than other regions of the energy absorbing element.

5. The fuselage structure according to claim 1, wherein the load mechanical strength of the energy absorbing element increases in a direction towards the cross member element.

6. The fuselage structure according to claim 1, wherein the energy absorbing element is formed integrally at least with one of the rib element and the cross member element.

7. The fuselage structure according to claim 1, wherein the rib element stiffens the outer skin on an underside of the fuselage.

8. The fuselage structure according to claim 1, wherein the rib element comprises at least one of a Z- and L-profile.

9. The fuselage structure according to claim 1, wherein the cross member element supports a hold floor of the fuselage.

10. The fuselage structure according to claim 1, wherein the cross member element runs rectilinearly between two arc-shaped rib elements.

11. The fuselage structure according to claim 1, wherein the cross member element comprises at least one of a J- and I-profile.

12. The fuselage structure according to claim 1, wherein the rib element is formed integrally with the cross member element.

13. The fuselage structure according to claim 1, wherein the mechanical strength of the coupling element is lower than the mechanical strength of the cross member element.

14. The fuselage structure according to claim 1, wherein the mechanical strength of the coupling element is higher than the mechanical strength of the energy absorbing element.

15. An aircraft comprising a fuselage structure, the fuselage structure comprising:
an outer skin having an arc-shaped inner curvature;
a structural component, wherein the structural component comprises:
a rib element formed in the shape of an arc corresponding to the inner curvature of said outer skin;
a cross member element, transversely connecting at least two arc sections of said arc-shaped rib element to each other, wherein the cross member element has a higher stiffness than the rib element; and
an energy absorbing element, connecting a load introduction zone of the rib element to an opposing section of the cross member element, the energy absorbing element having a profile comprising at least one of a closed circular profile, a closed elliptical profile, a half-closed Ω-shaped profile, a semi-circular profile, or a semi-elliptical profile; and
a stiffening element coupled to at least one arc section of the rib element via at least one coupling element, wherein the coupling element has a mechanical strength lower than a mechanical strength of the stiffening element.

16. A fuselage structure of an aircraft or spacecraft, comprising:
an outer skin having an arc-shaped inner curvature; and
a structural component, the structural component comprising:
a rib element formed in the shape of an arc corresponding to the inner curvature of said outer skin;
a cross member element, transversely connecting at least two arc sections of said arc-shaped rib element to each other, wherein the cross member element has a higher stiffness than the rib element;
an energy absorbing element, connecting a load introduction zone of the rib element to an opposing section of the cross member element, wherein the energy absorbing element comprises a profile part having a closed profile or a half-closed profile; and
a coupling element which couples an end region of at least one arc section of the rib element to a stiffening element for stiffening the outer skin, wherein the coupling element has a mechanical strength which is lower than a mechanical strength of the stiffening element.

17. The fuselage structure according to claim 16, wherein the energy absorbing element extends in a direction perpendicular to the rib element.

18. The fuselage structure according to claim 16, wherein the energy absorbing element extends in a direction perpendicular to the cross member element.

19. The fuselage structure according to claim 16, wherein the energy absorbing element comprises at an end facing away from the rib element, a trigger region, wherein the trigger region has a lower strength than other regions of the energy absorbing element.

20. The fuselage structure according to claim 16, wherein local mechanical strength of the energy absorbing element increases in a direction towards the cross member element.

21. The fuselage structure according to claim 16, wherein the energy absorbing element has a closed circular profile or a closed elliptical profile.

22. The fuselage structure according to claim 16, wherein the energy absorbing element has a half-closed O-shaped profile, a semi-circular profile or a semi-elliptical profile.

* * * * *